(No Model.)

T. J. WILLIAMS.
HARROW.

No. 324,442. Patented Aug. 18, 1885.

Fig. 1.

Fig. 2.

Attest:
Jno. W. Strehli
O. M. Hill

Inventor
Thomas J. Williams
per Wm. Hubbell Fisher
Atty.

UNITED STATES PATENT OFFICE.

THOMAS J. WILLIAMS, OF MOUNT LOOKOUT, OHIO, ASSIGNOR OF ONE-HALF TO CHARLES C. GRACE, OF SAME PLACE.

HARROW.

SPECIFICATION forming part of Letters Patent No. 324,442, dated August 18, 1885.

Application filed September 12, 1884. (No model.)

*To all whom it may concern:*

Be it known that I, THOMAS. J. WILLIAMS, a resident of Mount Lookout, in the county of Hamilton and State of Ohio, have invented certain new and useful Improvements in Harrows, of which the following is a specification.

The several features of my invention and the various advantages resulting from their use conjointly or otherwise will be fully hereinafter set forth.

In the accompanying drawings, making part of this application, Figure 1 is a view in perspective of a harrow embodying my improvements, and Fig. 2 is a central vertical section taken through a portion of the large or main cylinder and through the journal-bearing of the support of the platform and the eye encircling the shaft and connected to the rod or link connecting the large cylinder to the small cylinder.

The cylinder A is centered on the shaft or axle B, and is preferably rigidly secured to the said shaft. The cylinder A is provided with numerous teeth around its periphery, the teeth being arranged in annular rows.

The harrow is provided with a main or draft frame-work. One form of main frame-work is shown, and consists of the pieces or parts $d'$ and cross-pieces $d^2$. These pieces are preferably covered with a platform, R. To the main frame is centrally connected the draft pole or shafts I.

The main frame is supported upon the ends of shaft or axle B. A preferred mode of connecting the frame and the said shaft consists of the pieces or rods $ff$, one rigidly attached at its upper end to forward piece $d'$ and the other attached at its upper end to rear piece $d'$. The lower end of each piece $f$ is connected to a journal box or bearing, $f'$, on the shaft B. This arrangement of pieces $ff$ and journal box or bearing $f'$ at one end of shaft B is duplicated at the other end of said shaft B. The harrow is also preferably provided with a seat, as G, for the driver, and the same is suitably supported, the preferred means of support being as follows: The seat G is connected to and immediately upheld by a spring, $g$, a desirable form of which is shown. The spring is in turn upheld by the main frame, to which latter the spring is connected.

I will now proceed to describe the main and most important feature of my invention, viz: To the rear of the main cylinder is a smaller cylinder, shaft, or axis, D, provided peripherally with annular rows of teeth E. This cylinder is centered on a shaft, K, and is preferably rigidly connected thereto. When in use, the teeth of the rear cylinder, D, rest directly on the ground, as do also those of the main cylinder A. The cylinder D is so connected to the rest of the harrow as to be free to rotate and to follow the undulations of the surface of the ground over which the harrow is passed, and consequently be free to rise and fall with said undulations.

The preferred mode of connecting the cylinder D to the harrow is as follows: One end of a link or connecting-rod, H, is pivoted to the shaft B by an eye, $h$, loosely encircling the shaft and free to turn thereon. The other end of the link H is pivoted to the shaft K of cylinder D by an eye, $h'$, and is free to turn thereon. A similar link similarly connected is present at the other side of the harrow. The link is kept in place by suitable means, preferably, as shown, by a nut or equivalent fastening, $h^2$, screwed or secured on shaft K of cylinder D, and by locating the eye $h$ on shaft B between journal-bearing $f'$ and the cylinder A.

The mode in which my invention operates in general is as follows: When the harrow is drawn forward, the teeth $a$ catch in the ground and break it up. As the teeth catch in the ground the cylinder A is necessarily rotated in the direction shown by the arrow on the end of the cylinder, and the teeth $a$ on the under side of this cylinder pass rearward, and carry those portions of the loose clods which adhere to the teeth against the adjacent teeth E of cylinder D. This cylinder D (or its teeth) rests upon the ground, and as the harrow is moved forward its teeth catch in the ground and break up the latter. They also rotate cylinder D in the direction shown by the arrow upon the end of said cylinder, and carry any loose clods adhering to them over and against the teeth $a$ of cylinder A. The teeth $a$ and E, moving in opposite directions, thus mutually coact to clean from each other the adhering earth, while at the same time they pulverize the soil thoroughly. The cylinder D follows the undulations of the ground, and is free to rise and fall as the ground rises and falls. It will easily pass over stones and other obstructions. When made smaller than cylinder A, as is preferably the case, it revolves faster than cylinder A, and its operation as a cleaner is thereby enhanced. At the same time the draft-frame is free to tip up and down, and when so tipped will not interfere with the action of the cylinders.

Any suitable description of teeth may be employed on the cylinders; but I prefer to use those of diamond shape in cross-section. The teeth are suitably secured to their respective cylinders A and D. I prefer to make the cylinders of wood, and to secure the teeth by tightly inserting them in the cylinders.

When desired, a washer, $f^2$, may be put on shaft B outside of the eye $f'$, and fixed in position by a set-screw, $f^3$, thus preventing any tendency of the eye $f$ to spring off from the shaft B.

What I claim as new and of my invention, and desire to secure by Letters Patent, is—

1. In a harrow, the large toothed cylinder A and small toothed cylinder D, the latter being located close behind cylinder A and resting on the ground, both cylinders being turned by their contact with the ground and revolving independently of one another, the teeth of one cylinder passing between those of the other, the small cylinder being drawn by yielding connections which leave it free to follow the undulations of the ground independently of the frame and of the large cylinder, substantially as and for the purposes specified.

2. In a harrow, the large cylinder A and cylinder D, the latter resting on the ground immediately in rear of cylinder A, the teeth of the one cylinder passing between the teeth of the other cylinder, each cylinder being free to follow the undulations of the ground independently of the other cylinder, and each cylinder being turned by the ground alone and independently of the other cylinder, the journals or axis of cylinder D being connected to the journals or axis of cylinder A by connecting rods or links, substantially as and for the purposes specified.

3. The combination of toothed cylinder A, shaft B, main draft-frame, supports $f$ meeting in journal-bearings, as $f'$, links H, having eye $h$ on shaft B between journal-bearings $f'$, and the cylinder A, and toothed cylinder D, having shafts K, the links H, each having eye $h'$, secured pivotally on shaft K, the teeth of cylinder A engaging between the teeth of cylinder D, substantially as and for the purposes specified.

THOMAS J. WILLIAMS.

Witnesses:
JNO. W. STREHLI,
O. M. HILL.